G. I. DE FORCE.
PLOW.
APPLICATION FILED MAR. 9, 1912.
1,076,872.
Patented Oct. 28, 1913.
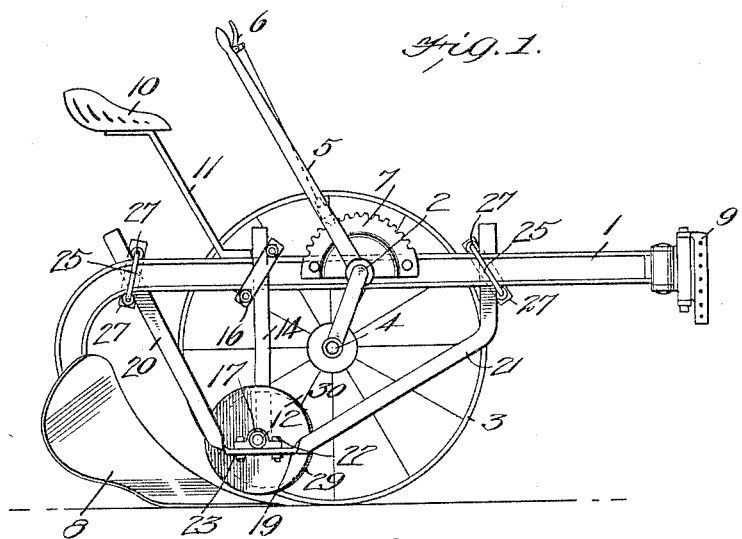
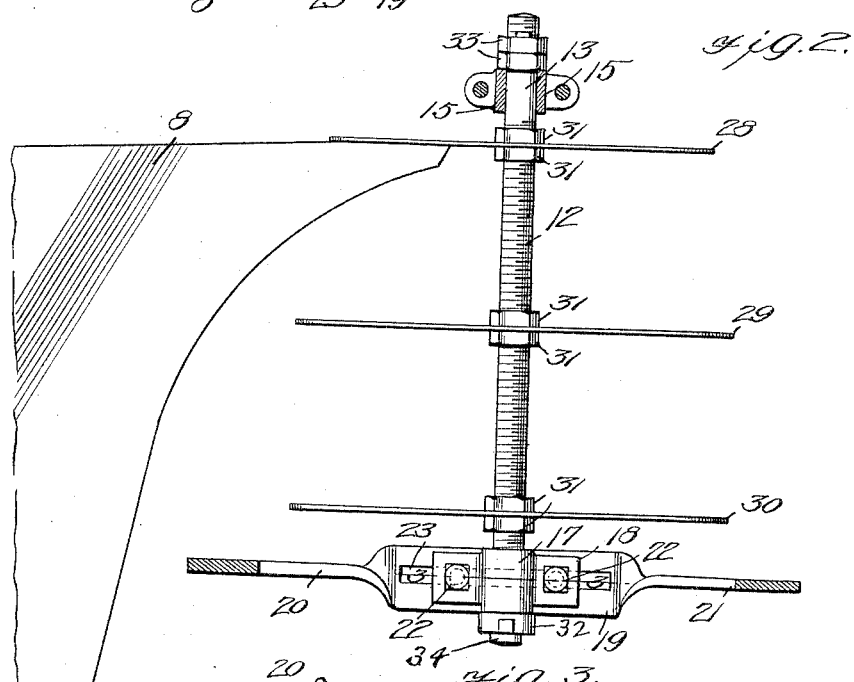
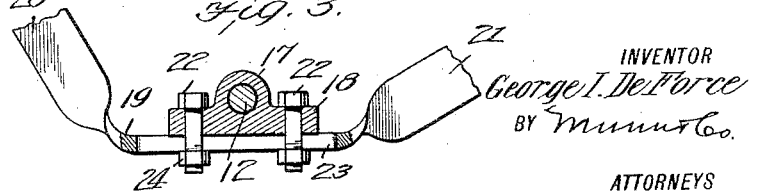
WITNESSES
INVENTOR
George I. De Force
BY Munn & Co.
ATTORNEYS ized coming 
UNITED STATES PATENT OFFICE.

GEORGE I. DE FORCE, OF ERIE, PENNSYLVANIA, ASSIGNOR OF ONE-THIRD TO ALLEN H. SMITH, ONE-THIRD TO LYNN E. STANCLIFF, AND ONE-THIRD TO ELI D. SMITH, ALL OF ERIE, PENNSYLVANIA.

PLOW.

1,076,872.      Specification of Letters Patent.      Patented Oct. 28, 1913.

Application filed March 9, 1912. Serial No. 682,614.

*To all whom it may concern:*

Be it known that I, GEORGE I. DE FORCE, a citizen of the United States, and a resident of Erie, in the county of Erie, State of Pennsylvania, have invented a new and useful Improvement in Plows, of which the following is a specification.

My invention is an improvement in plows, and has for its object the provision of a simple, inexpensive device for absolutely overcoming side draft in sulky or riding plows, capable of attachment to any character of wheel supported plow, which may be attached without change in the plow, which is capable of adjustment in accordance with the character of the soil, which does not increase the draft, but, on the contrary, lessens the draft, and which will assist in pulverizing the soil without interfering with the turning of the furrow slice.

In the drawings: Figure 1 is a side view of a plow provided with the attachment, with the near wheel removed; Fig. 2 is a sectional view on the line 2—2 of Fig. 1; and Fig. 3 is a similar view on the line 3—3 of Fig. 2.

The present embodiment of the invention is shown in connection with a sulky or riding plow comprising a beam 1, an axle 2 arranged transversely of the beam, and a wheel 3 journaled on each end of the axle. The near wheel is not shown, in order that the improvement may not be obscured. The wheels 3 are journaled on crank arms 4 on the ends of the axle, and each may be adjusted vertically with respect to the beam by means of the lever 5 having the usual latch mechanism 6 coöperating with the toothed quadrant 7. The plow 8 is connected to the rear end of the beam, and the draft apparatus is connected to the clevis 9 at the front end of the beam. A seat 10 is supported at the rear of the beam by means of a spring plate 11.

In plows of the type in question one of the wheels necessarily runs in the furrow, or in the plowed ground, so that the draft is unequal, and there is a very pronounced tendency on the part of the plow to swing to one side, that is, to the side on which the draft is greatest. Numerous expedients have been adopted to overcome this tendency, as, for instance, the inclining of the plane of one wheel with respect to the other, but all are open to objection. The present invention entirely overcomes the tendency to side draft and without the addition of any mechanism that does not assist in the primary function of the plow, that is, the loosening and turning of the soil.

The improvement comprises a shaft 12 arranged below and behind the axle, and in front of the plow, the said shaft being threaded, except at its ends, which are reduced and plain, as shown at 13. The shaft is supported at its inner end by means of a bar 14 provided at its lower end with a sectional bearing 15 for receiving the adjacent end 13 of the shaft. The upper end of the bar is secured adjustably to the beam 1 by means of a clip to be described later, or in any other suitable manner that will permit the arm to be adjusted vertically. The outer end of the shaft is journaled in a bearing 17 in a bearing block 18, which is slidable laterally with respect to the shaft on the central portion or body 19 of a substantially U-shaped bracket comprising the body 19 and a pair of arms 20 and 21. The bearing block is provided with an opening at each end for receiving a bolt 22, and the body 19 of the bracket is provided with a longitudinal slot 23 for receiving the bolts. Each bolt is engaged by a nut 24 below the bracket body, and the block may be secured rigidly to the bracket by means of the bolts and nuts. The bracket 19—20—21 is formed from a bar rectangular in cross section, the portion of the bar forming the body being arranged with its widest dimension horizontal. The ends of the bar are given a quarter turn at each end of the body, as shown more particularly in Fig. 1, and each arm 20 and 21 is adjustably connected to the beam. The arm 20 extends upwardly and rearwardly and is connected to the beam in rear of the connection of bar 14 by means of a clip similar to that for the bar 14. The arm 21 extends forwardly to approximately the front portion of the wheel and is then bent upwardly at an angle to the main portion of the arm, as shown at 26, and is adjustably secured to the beam by means of a clip of the same character as used for bar 14 and arm 20.

Each of the clips before mentioned for connecting bar 14 and arms 20 and 21 to the beam consists of a substantially U-shaped bracket comprising a body 25 and arms 27, each arm having its free end threaded. The bracket is arranged on one side of the beam with the arms astride the beam, and a plate 16 is arranged on the opposite side of the beam and is provided with openings at its ends for receiving the arms 27. Nuts are threaded onto the arms 27 of the brackets, and the bar 14 and arms 20 and 21 are arranged between the plate and the beam. It will be evident that when the nuts are loosened the bar or arms may be moved longitudinally in either direction and may be secured rigidly by tightening the nuts. A plurality or series of disks 28, 29 and 30 is arranged on the shaft 20 in spaced parallel relation, and each disk is held in fixed position by means of a pair of nuts 31, the members of each pair of nuts being arranged on opposite sides of the disk. Three disks are preferably used, the innermost, 28, being at the landside of the plow. The disks may be easily adjusted laterally by turning the nuts in the direction in which it is desired to adjust the disk, and the disks are held rigidly when the nuts are turned tightly against the opposite faces thereof. The shaft 12 is prevented from longitudinal movement by means of a collar 32 on its outer end outside of the body 19 of the bracket, and a pair of nuts 33 on the inner end. The collar 32 is held in position by means of a set-screw 34 and the inner end of the shaft is perforated to receive a pin. The outer end of the shaft may be adjusted laterally by means of the bolts 22 and nuts 24, the bolts moving in the slot 23 of the body of the bracket. The shaft may also be adjusted vertically by means of the clips.

In use, the shaft 12 is arranged in such position that the lower edges of the disks are slightly above the bottom of the furrow. The disks are cutting disks and are so arranged that they will cut approximately half the depth of the plow. When so arranged, they will thoroughly cut up and pulverize the strip of soil turned, but will not separate the strip into three distinct portions. The strip of soil turned will hold together sufficiently to turn over, yet the sod will be divided partially into three portions. The outermost disk 30 is not as far out as the outer side of the plow share, being at approximately the outer side of the point of the plow. The shaft is inclined rearwardly toward its outer end, the extent of inclination depending upon the condition of the soil. With the shaft inclined as specified, the planes of the disks are also inclined, and the disks exert a certain amount of drag or pull, the amount depending upon the extent of inclination. The greater the inclination, the greater the pull or drag. The extent of inclination of the shaft will, of course, vary with the condition of the soil, and the amount of inclination necessary to equalize the tendency to side draft may be easily ascertained by trial, and, when once ascertained, need not be varied unless conditions change.

The innermost disk 28 acts as a colter to separate the slice from the soil, and thus assists the plow and lessens the direct draft, in addition to its action in lessening the side draft. The other disks 29 and 30 assist the plow in pulverizing the soil. The device may be attached to any form of sulky or riding plow.

I claim:

1. In combination with a plow comprising a beam and wheels for supporting the beam, and the plow attached to the beam, of a shaft arranged in front of the plow and transverse to the beam, a bar provided with a bearing for the inner end of the shaft, a substantially U-shaped bracket comprising a body and arms, the body having a longitudinal slot, a bearing block slidable on the body and provided with a bearing for the outer end of the shaft, bolts for connecting the block to the body, said bolts passing through the slot, nuts engaging the bolts for securing the block in place, means for adjustably connecting the upper end of the bar to the beam, means for adjustably connecting each arm of the bracket to the beam, said shaft being threaded, a series of three disks arranged on the shaft in spaced relation, and nuts for holding each disk in place, a nut being arranged on each side of each disk.

2. In combination with a plow comprising a beam and wheels for supporting the beam, and the plow attached to the beam, of a shaft arranged in front of the plow and transverse to the beam, a bar provided with a bearing for the inner end of the shaft, a substantially U-shaped bracket comprising a body and arms, the body having a longitudinal slot, a bearing block slidable on the body and provided with a bearing for the outer end of the shaft, bolts for connecting the block to the body, said bolts passing through the slot, nuts engaging the bolts for securing the block in place, means for adjustably connecting the upper end of the bar to the beam, means for adjustably connecting each arm of the bracket to the beam, a series of disks arranged adjustably on the shaft in spaced relation, and means for securing each disk in adjusted position.

3. In combination with a plow comprising a beam and wheels for supporting the beam, and the plow attached to the beam, of a shaft arranged in front of the plow and transverse to the beam, a bar provided with a bearing for the inner end of the shaft, a substantially U-shaped bracket comprising a body and arms, a bearing block adjustable longitudinally of the body and provided with a bearing for the outer end of the shaft, means for securing the block in adjusted position, means for adjustably connecting the bar to the beam, means for adjustably connecting each arm of the bracket to the beam, a series of disks adjustable longitudinally of the shaft, and means for securing each disk in adjusted position.

4. In combination with a plow comprising a beam and wheels for supporting the beam, and the plow attached to the beam, of a shaft arranged transversely of the beam in front of the plow, means for supporting the inner end of the shaft, means for supporting the outer end of the shaft, an adjustable connection between each of the said means and the beam, the shaft being movable laterally on the supporting means at the outer end, means for securing the end of the shaft in adjusted position, a series of spaced cutting disks adjustable longitudinally of the shaft and rotatable therewith, and means for securing each disk to the shaft.

5. In combination with a single plow having a landside and a mold board, a series of rotary cutters arranged in front of and adjacent to and above the cutting edge of the plow and with their planes approximately vertical, the said cutters being spaced apart to partially cut the furrow into strips before it is turned, and to cover approximately the width of the furrow turned, one of the said cutters being in approximate alinement with the landside of the plow, a common support for the cutters, a bracket connecting each end of the said support and the plow, and means in connection with one of the said brackets for permitting the adjacent end of the support to be moved laterally to vary the inclination of the planes of the cutters with respect to the landside.

6. In combination with a single plow having a landside and a mold board, of a series of cutters arranged in front of and adjacent to and above the cutting edge of the plow and with their planes approximately vertical and with the innermost cutter in approximate alinement with the landside, the said cutters being spaced to partially cut the furrow into strips before the said furrow is turned, means for connecting the cutters to the plow, and means in connection with the said connecting means for permitting the cutters to be adjusted with respect to the plow to vary the angle of the planes of the cutters with respect to the landside.

GEORGE I. DE FORCE.

Witnesses:
C. E. TRAINOR,
SOLON C. KEMON.

---

Copies of this patent may be obtained for five cents each, by addressing the "Commissioner of Patents, Washington, D. C."